(No Model.)
H. UNZICKER.
SHAFT AND WHEEL COUPLING.
No. 433,968. Patented Aug. 12, 1890.
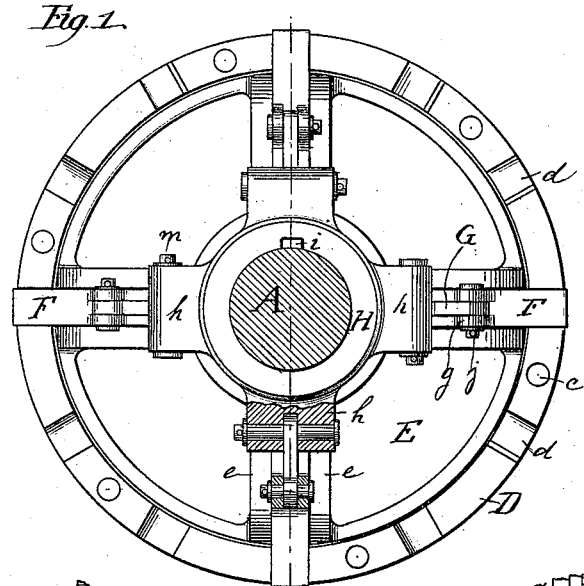
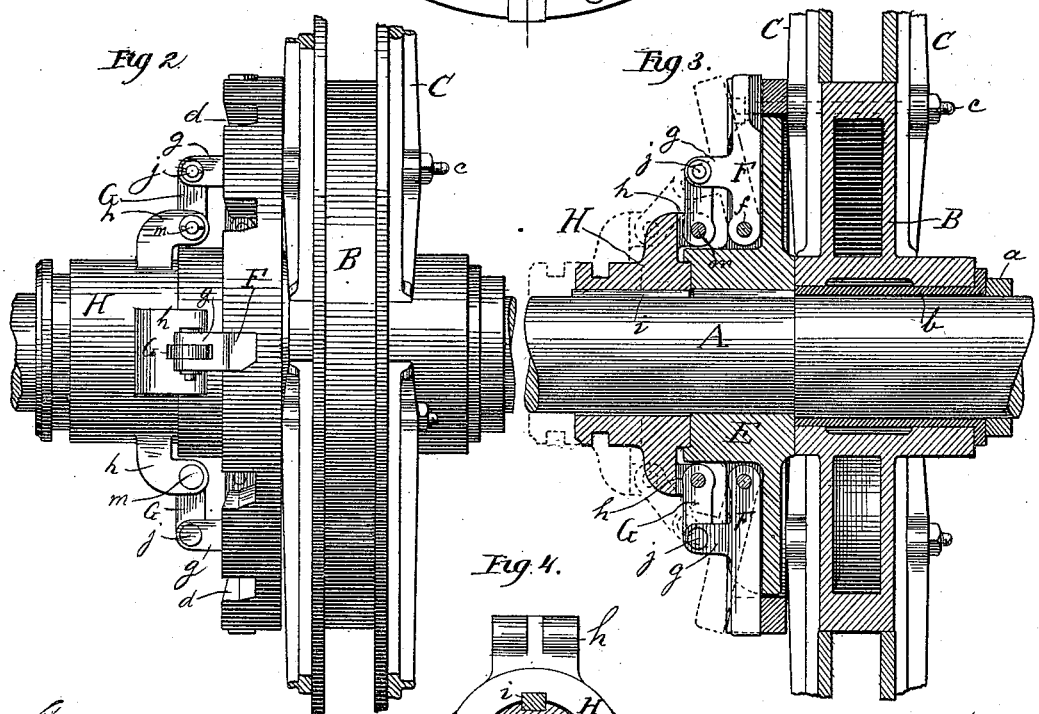
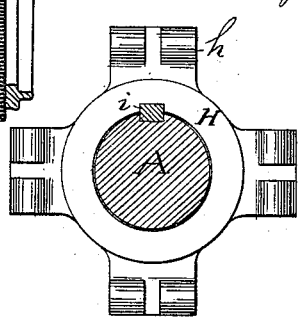
Witnesses:
Fred Gerlach
Otto Luebkert
Inventor:
Herman Unzicker
By Wm. H. Lotz
Attorney.

UNITED STATES PATENT OFFICE.

HERMAN UNZICKER, OF CHICAGO, ILLINOIS.

SHAFT AND WHEEL COUPLING.

SPECIFICATION forming part of Letters Patent No. 433,968, dated August 12, 1890.

Application filed April 21, 1890. Serial No. 348,857. (No model.)

*To all whom it may concern:*

Be it known that I, HERMAN UNZICKER, a citizen of the United States of America, residing at Chicago, in the county of Cook and State of Illinois, have invented certain new and useful Improvements in Shaft and Wheel Couplings, of which the following is a specification, reference being had therein to the accompanying drawings.

This my invention relates to coupling devices for intermittently transmitting motion from a shaft to a wheel loosely sleeved thereon, or, vice versa, from a wheel to its shaft; and it is more particularly intended for driving the spools for hoist ropes or cables in mines.

The object of my invention is to provide a coupling for the intended purpose that will form a rigid connection between the shaft and spool with a slight and easy movement, that can be easily disconnected for throwing the spool out of gear, and in which the parts can be constructed of proportionally much less metal than in couplings heretofore applied for such purposes; and with these objects in view my invention consists of the novel devices and combinations of devices hereinafter described, and specifically claimed.

In the accompanying drawings, Figure 1 represents an end elevation, Fig. 2 a side elevation, and Fig. 3 a longitudinal vertical section, through the center line of my coupling; and Fig. 4 is an elevation from the inward face of the laterally-shifting sleeve of the coupling.

Corresponding letters of reference in the several figures of the drawings designate like parts.

A denotes the shaft driven continuously by steam or water, and B is the hub portion of a spool intended for a flat or band-shaped wire cable, and having secured in its bore a gun-metal bushing $b$, fitted upon shaft A to turn loose thereon. Against the two sides of the rim of this hub B are secured by bolts $c$ $a$ series of radial arms C, against the inward faces of which are secured segmental linings of wood for the cable to wind between. Against the arms C at one side of the spool-hub is secured an iron ring D by the head portions of bolts $c$, passing through the same, with the heads of the bolts countersunk therein. This ring D is provided in its outward edge with twelve (more or less) notches $d$, circumferentially equally divided, which notches $d$ are made to present square shoulders on their sides in one direction and beveled bottom corners on their sides in the opposite direction.

The hub B is held from lateral movement on shaft A by a collar $a$, secured upon the shaft against one end of said hub and by the hub of a disk E against the opposite end thereof, which disk E is rigidly mounted upon shaft A and secured by a key to turn therewith, and the exterior diameter of which disk is sufficiently less than the inside diameter of ring D to enter the same and move therein. To its outward face this disk E has formed by double ribs $e$ four (more or less) radial sockets or grooves coinciding with any corresponding number of notches $d$ in ring D, and into the inward end of each groove or socket near the hub of disk E is pivotally secured a bar F by a pin $f$, passed through the eyed end of the bar F and through the ribs of disk E laterally to swing therein. Each such bar F being snugly fitted between the ribs $e$, its exterior end extends radially a little beyond the exterior circumference of ring D, the notches $d$ therein being in line with the grooves or sockets for bars F in the disk, and the outer ends of bars F also snugly fitting into said notches $d$, with one corner of each bar F chamfered correspondingly with the beveled corners in these notches, which chamfer is provided for a more ready entering of a bar into a notch. It will be readily seen that the bars F, thus engaged with the notches $d$ of ring D, will couple the spool to rotate with the shaft, and disengagement of these bars F from the notches $d$ by a laterally-swinging movement of the same will uncouple the spool, either to remain stationary or to be rotated in a reversed direction from the shaft for unwinding the cable.

Each bar F has at about its middle a rectangularly-projecting bifurcated and eyed arm $g$, and upon the shaft A is loosely fitted a sleeve H, moving upon a feather $i$ of such shaft to rotate therewith, but to permit a laterally-sliding movement thereof, this sleeve H having near one end an annular groove for the engagement of the bifurcated end of a shifting-lever of the usual construction. To its opposite end the sleeve H has flanges with laterally-projecting eye-lugs $h$, extending over the hub of disk E, and being also bifurcated, and each such eye-lug $h$ is connected with an arm $g$ of a bar F by a link G, pivotally secured with one eyed end inserted into the bifurcated eyed arm $g$ of a disk E and secured by a pin $j$ therein, and with its opposite end inserted into a bifurcated lug $h$ of sleeve H and secured by a pin $m$ therein. It will be readily seen that the lateral shifting of sleeve H will thus impart a uniform swinging movement of all the bars F, either to enter the notches $d$ of ring D, when the links will be on a parallel position with bars D, and will thus, similar to a toggle-joint, be self-holding, or with moving the sleeve H away from the disk E all the bars F will be swung outward to clear these notches $d$ of ring D, as shown by dotted lines in Fig. 3.

A coupling thus constructed will be very strong and durable and cannot easily get out of order.

What I claim is—

1. The combination, with a spool or wheel B, mounted upon shaft A and having ring D, provided with a series of notches $d$, and being rigid with wheel B, of disk E, rigidly mounted upon a shaft A and provided with a series of pivotal laterally-swinging bars F, engaging notches $d$, and suitable means for simultaneously swinging such bars F into or out of engagement with notches $d$, substantially as and in the manner described.

2. The combination, with a spool or wheel B, loosely mounted upon shaft A and having ring D, provided with a series of notches $d$, of disk E, rigidly mounted upon shaft A and having a series of radial sockets for bars F pivotally secured therein and engaging notches $d$, and each bar F provided with a rectangular arm $g$, laterally-shiftable sleeve H, having lugs $h$, and links G, pivotally connecting the arms of bars F with lugs $h$ of sleeve H, all substantially as set forth, to operate as specified.

In testimony whereof I affix my signature in presence of two witnesses.

HERMAN UNZICKER.

Witnesses:
   WM. H. LOTZ,
   OTTO LUEBKERT.